(12) United States Patent
Lange

(10) Patent No.: US 8,517,450 B2
(45) Date of Patent: Aug. 27, 2013

(54) SAFEGUARD FOR THE SLIDING DOOR OF A MOTOR VEHICLE

(75) Inventor: Marcus Lange, Pfungstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 12/753,013

(22) Filed: Apr. 1, 2010

(65) Prior Publication Data

US 2010/0253116 A1  Oct. 7, 2010

(30) Foreign Application Priority Data

Apr. 3, 2009  (DE) .......................... 10 2009 016 221

(51) Int. Cl.
*B60J 5/06* (2006.01)
(52) U.S. Cl.
USPC ................. 296/146.6; 296/187.12; 296/146.9
(58) Field of Classification Search
USPC ............. 296/146.1, 146.5, 146.6, 146.9, 149, 296/187.03, 187.09, 187.12
See application file for complete search history.

(56) References Cited

U.S. PATENT DOCUMENTS

| | | | |
|---|---|---|---|
| 5,626,384 A | 5/1997 | Walther | |
| 6,324,948 B1 | 12/2001 | Kavc et al. | |
| 6,631,933 B1 | 10/2003 | Westerwick | |
| 6,722,717 B2 | 4/2004 | Kuhnke | |
| 7,059,654 B2 * | 6/2006 | Ichinose | 296/146.1 |
| 2009/0322119 A1 * | 12/2009 | Fannon et al. | 296/146.9 |

FOREIGN PATENT DOCUMENTS

| | | |
|---|---|---|
| DE | 824444 C | 12/1951 |
| DE | 8107964 U1 | 9/1981 |
| DE | 19929242 A1 | 12/2000 |
| DE | 20315355 U1 | 12/2003 |
| DE | 102004060325 A1 | 6/2006 |
| DE | 102006033950 A1 | 1/2008 |
| DE | 102007039803 A1 | 2/2009 |
| EP | 1784312 A1 | 5/2007 |
| FR | 2829790 A1 | 3/2003 |
| GB | 659098 A | 10/1951 |
| JP | 1223276 A | 9/1989 |
| JP | 05330453 A * | 12/1993 |
| WO | WO 2008017912 A2 * | 2/2008 |

OTHER PUBLICATIONS

Striker Installation Structure, full human translation of foreign reference document JP-05-330453, translated by:The McElroy Translation Company and provided to the USPTO, Oct. 2012.*
German Patent Office, German Search Report for Application No. 102009016221.6, Jun. 16, 2009.

* cited by examiner

*Primary Examiner* — Glenn Dayoan
*Assistant Examiner* — Jason S Daniels
(74) *Attorney, Agent, or Firm* — Ingrassia Fisher & Lorenz, P.C.

(57) ABSTRACT

A sliding door arrangement for a motor vehicle is provided with a safeguard for securing and/or reinforcing the sliding door against exposure to external forces. The arrangement includes safeguard elements arranged on a column-side and door-side carrier, which in the closed position of the sliding door viewed in the transverse direction of the vehicle come to overlap each other at least regionally. At least one of the safeguard elements is arranged with a mounting plate on a column- or door-side carrier, and abuts a rear side of the carrier facing away from the opposing carrier.

15 Claims, 4 Drawing Sheets

SAFEGUARD FOR THE SLIDING DOOR OF A MOTOR VEHICLE

CROSS-REFERENCE TO RELATED APPLICATION

This application claims priority to German Patent Application No. 102009016221.6, filed Apr. 3, 2009, which is incorporated herein by reference in its entirety.

TECHNICAL FIELD

The present invention relates to a sliding door arrangement for a motor vehicle with a safeguard for securing and/or reinforcing the sliding door against external forces acting on the sliding door.

BACKGROUND

Motor vehicles with sliding doors are sufficiently known from prior art. They have at least one lock, with which the sliding door is with a bordering column is connected in the closed state. It here proves necessary to provide a safeguard in the transition area between the sliding door and bordering column with which the sliding door can additionally be secured to the column, for example a B- or C-column, or held during exposure to external forces. In particular in the face of deformation forces caused by crash or collision, the sliding door can be placed under a particularly strong outward stress.

Known from EP 1 784 312 B1 is a sliding door arrangement with a retention unit, which in the closed position of the door can engage with a guide rail of the sliding door, so as to hold back the door relative to the vertical axis of the vehicle when the door experiences an impact. However, such a retention unit is only conditionally suitable for absorbing forces acting on the door in the transverse direction to the vehicle, in particular outwardly acting forces.

In order to absorb or buttress especially high forces of the kind that arise during a collision, consideration might be given to incorporating a second lock. However, this would involve a greater assembly and cost outlay. In addition, a mechanical synchronizing device would be needed to couple both locks.

Therefore, at least one object of the invention is to provide a sliding door arrangement for a motor vehicle with an improved safeguard, which is characterized by an elevated stability and functional reliability, has a simplified design in terms of assembly, and is especially cost effective to manufacture. In addition, other objects, desirable features, and characteristics will become apparent from the subsequent summary and detailed description, and the appended claims, taken in conjunction with the accompanying drawings and this background.

SUMMARY

The object of the invention is achieved by means of a sliding door arrangement according, a motor vehicle, and an assembly method The sliding door arrangement according to an embodiment of the invention has a sliding door that can slide relative to a motor vehicle body and when closed borders a column of the body, for example a B- or C-column. Also provided is a safeguard to secure and/or reinforce the sliding door against external forces, preferably those acting in the transverse direction of the vehicle. It is here provided in particular that the sliding door be secured against exposure to outwardly directed forces acting in the transverse direction of the vehicle.

The safeguard itself has safeguard elements that interact with each other, and are arranged on a body-side carrier and a door-side carrier. In the closed position of the sliding door viewed in the transverse direction of the vehicle, the safeguard elements come to cover or overlap each other at least regionally, so that given deformations of the sliding door and/or the bordering columns directed in the transverse direction of the vehicle, the two safeguard elements engage each other, thereby preventing the sliding door from detaching from the column.

At least one of the safeguard elements is arranged on a column- or door-side carrier by means of a mounting plate, wherein the mounting plate comes to abut against a rear side of the carrier. The rear side of a carrier is regarded as the surface of the carrier facing away from a carrier that lies opposite in the closed position and is provided with a corresponding safeguard element.

The two door-side and column-side carriers at least regionally come to overlap each other in the closed position of the sliding door as viewed in the longitudinal direction of the vehicle, wherein their front sides face each other, and their rear sides face away from each other.

The mounting plate that comes to abut and support the rear side of a carrier makes it possible to create an especially spacious supporting and abutment surface that essentially corresponds to the geometry of the mounting plate between the safeguard element and carrier. Proceeding in this way, point stresses arising in the event of a crash, for example, can be reduced or even avoided.

The rear abutment of the mounting plate against the allocated carrier makes it possible to provide an elevated functional security and stability for the safeguard. This is because, given a deformation of the sliding door and/or bordering column, for example induced by a crash, a tensile stress acting on the safeguard elements can be introduced over the entire surface of the mounting plate into the rear side of the corresponding column- or sliding door-side carrier.

A first advantageous further development of the invention provides that the carrier has a through hole for at least one of the safeguard elements, the edge of which supports the respective safeguard element by means of a mounting plate expanded like a flange relative to the through hole. Thereby provided in terms of assembly technique is to arrange at least one of the safeguard elements so that it extends at least regionally from the rear side of a door- or column-side carrier through or into a through hole formed on the carrier.

Any tensile stresses acting on the safeguard element as the result of arising door- or column-side deformations can be distributed over a comparatively large abutment surface by the mounting plate of the safeguard element and introduced into the carrier.

In another advantageous further development of the invention, both the door-side and column-side carrier can have through holes that at least regionally overlap relative to each other. The two edges or the surface sections bordering the respective through holes can come to abut with safeguard elements each provided with a mounting plate expanded like a flange, and be secured by means of the mounting plate to both the carrier and the door.

Provided to this extent is a rear arrangement of the safeguard elements on the allocated carriers for both safeguard elements that correspond with each other. The arrangement of both corresponding safeguard elements on rear sides of the door-side and column-side carrier facing away from each other can further increase the stability and functional reliability of the safeguard.

In another advantageous embodiment of the invention, the safeguard element has a restraining bracket or retention hook, which when mounted on the carrier at least regionally penetrate through the through hole formed thereon or at least regionally project into the latter. Because at least one of the safeguard elements passes through the through hole formed on the carrier from the rear of the carrier, an at least regionally overlapping arrangement of the safeguard elements corresponding with each other can be achieved in the closed position of the sliding door as viewed in the transverse direction of the vehicle.

Given a deformation of the sliding door or column directed in the transverse direction of the vehicle, the safeguard elements engage each other as intended. Any tensile stresses resulting from the above are introduced into the rear side of the door- and/or column-side carrier via the safeguard elements and the mounting plates connected thereto.

Another especially advantageous further development of the invention provides that at least one of the safeguard elements has a locating hole with retention hooks arranged opposite in the transverse direction of the vehicle. Facing away from the column- and/or door-side carrier, these retention hooks each have a back-cut for accommodating a corresponding safeguard element, preferably designed as a strike member.

Provided here in particular is that the strike member arranged on the sliding door, for example, comes to lie in the locating hole of the column-side safeguard element as the door reaches the closed position, wherein the column-side retention hooks are spaced apart in the transverse direction of the vehicle to an extent that enables a contactless accommodation of the strike member.

In the closed position of the sliding door, the strike member comes to lie behind the back-cuts of the retention hooks viewed in the longitudinal direction of the vehicle, so that the strike member is shifted relative to the retention hook given a deformation in the transverse direction of the vehicle in such a way that it comes to lie in a corresponding back-cut, thereby preventing the sliding door from detaching from the bordering carrier.

In another advantageous embodiment of the invention, the safeguard element has a structurally reinforcing frame, which when mounted on the carrier comes to lie flush with the carrier-side locating hole and/or within said locating hole of the carrier. The structurally reinforcing frame of the safeguard element preferably extends perpendicular to the mounting plate of the safeguard element. In this case, it can be provided in particular that these retention hooks be molded onto the interior of the frame as a single piece. Such a safeguard element is here preferably designed as a casting or die casting component.

In another embodiment of the invention, the mounting plate of the safeguard element is provided with at least one attachment hole for accommodating an attachment element. This attachment hole can be designed as a through hole, a screw hole with or without a corresponding female thread. Welds, screws or studs are preferably used as the attachment elements.

Another embodiment can provide that a weld nut be arranged on the attachment hole of the mounting plate and/or on a carrier-side attachment hole arranged flush thereto in the assembled position. In this way, a door- or column-side carrier and/or the mounting plate of a safeguard element can be prefabricated, so that only one screw corresponding with the weld nut or a corresponding bolt is to be provided during the actual assembly process for attaching the safeguard element to the allocated carrier. This makes it possible to reduce and simplify the assembly time and outlay, along with the handling of individual attachment elements.

Another especially advantageous embodiment of the invention provides that the safeguard element is connected or molded to the mounting plate as a single piece. For example, the safeguard element extending into or passing through the locating hole of the carrier can be fabricated as a casting together with its mounting plate. It is further conceivable to connect the safeguard element with the allocated mounting plate in a materially flush manner, for example via welding.

In another independent aspect, the invention relates to a motor vehicle with a sliding door and a bordering column of a vehicle body, in particular a B- or C-column. This motor vehicle is characterized by a sliding door arrangement according to the invention, which is provided with a safeguard device described above.

In a further independent aspect, the invention relates to a method for assembling a safeguard on the sliding door arrangement of a motor vehicle, which has a sliding door that can slide relative to a motor vehicle body and in the closed position borders a column of the vehicle body. For securing and/or reinforcement purposes, the sliding door arrangement has corresponding safeguard elements on the column- and sliding door-side arranged on a carrier.

In terms of assembly, it is here provided that at least one of the safeguard elements is inserted from a rear side of the carrier into a locating hole provided on the respective carrier. The two carriers opposing with the sliding door in the closed position have rear sides facing away from each other and front sides facing each other. The at least one safeguard element, preferably both safeguard elements, are inserted into the carrier-side locating hole from their rear side until the respective safeguard element with a mounting plate comes to abut the rear side of the carrier. The safeguard element is further rigidly connected with the carrier by means of the mounting plate that comes to abut the carrier, for example via a screwed or welded connection.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
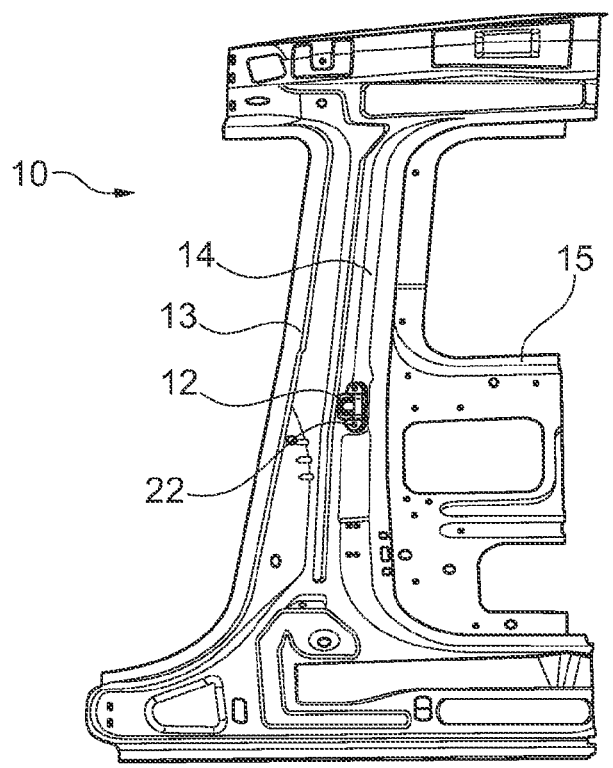
FIG. 1 is a perspective view of a sliding door carrier in the closed position, inside the vehicle.
Figure 2:
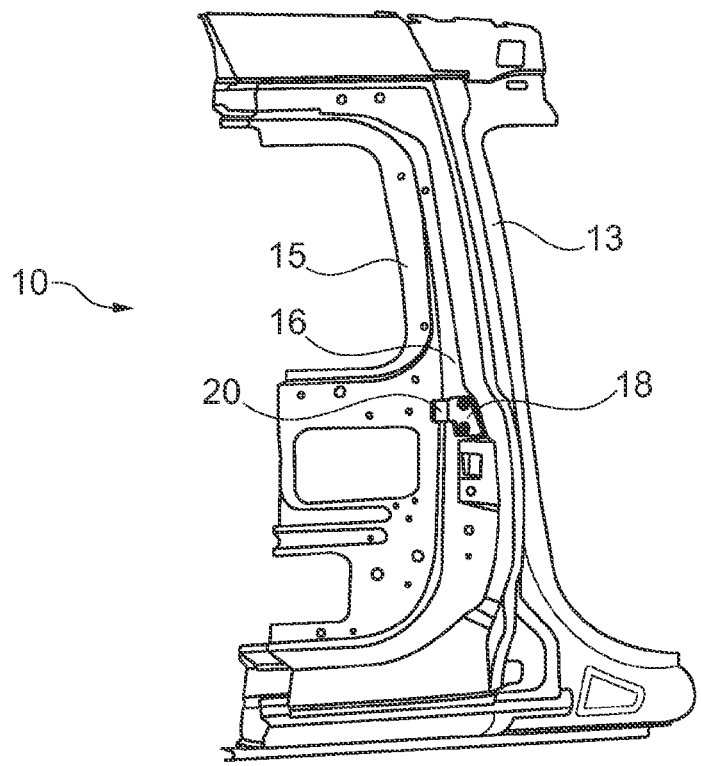
FIG. 2 is the sectionally depicted sliding door arrangement according to FIG. 1, from outside.

The sliding door arrangement 10 shown in perspective on FIG. 1 and FIG. 2 from the interior and exterior of the vehicle has a sliding door 15 that can slide in the longitudinal direction of the vehicle along a vehicle body, and in the configuration depicted on FIG. 1 and FIG. 2 borders a body-side column 13 of the vehicle when closed. For the sake of simplicity, the figures all just show the supporting doorframe and supporting structural parts of the body.

Arranged in the transitional area between the column 13 and sliding door 15 is a two-part safeguard 12, 22 intended to prevent the sliding door 15 from detaching from the column 13, especially given deformations of the sliding door 15 or column acting in the transverse direction of the vehicle. In the exemplary embodiment shown, a door lock is arranged on the door section lying opposite the safeguard 12, 22, which is not depicted explicitly on the figures.

The safeguard has two corresponding safeguard elements 12, 22. The strike member 12 is arranged on a carrier sheet 16 extending laterally or frontally relative to the door 15, while the column-side safeguard element 22 having a receptacle 42 for the strike member 12 is situated on an opposing carrier sheet 14 of the column 13. A through hole is formed on both carrier sheets 14, 16. The strike member 12 here penetrates through the through hole provided on the door-side carrier 16 from the rear side of the carrier 16.

Figure 3:
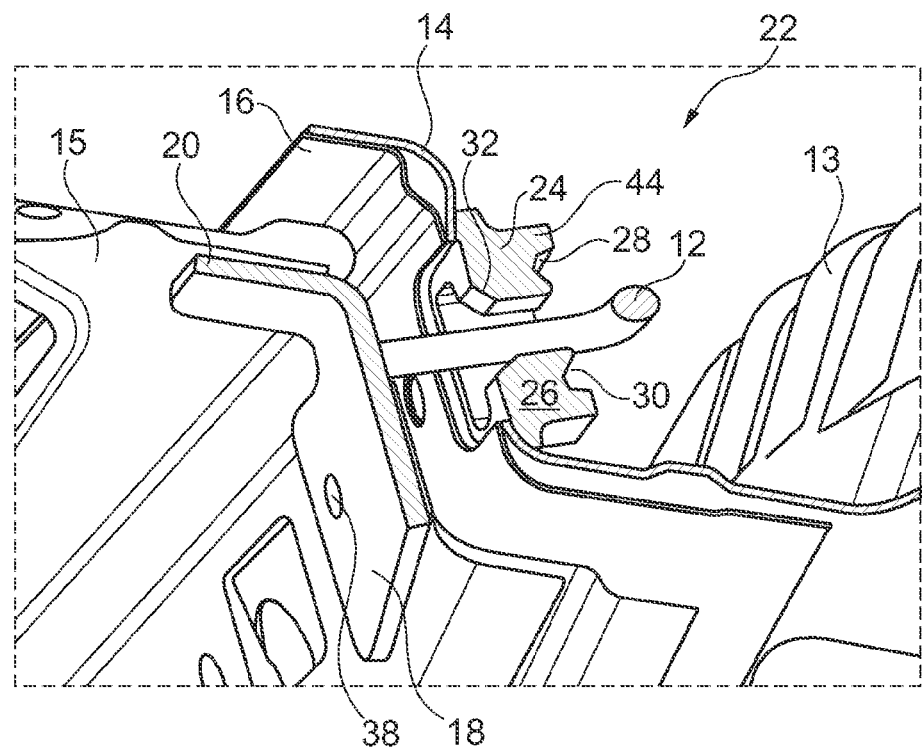
FIG. 3 is a partially cut perspective view of the corresponding safeguard elements viewed from the outside of the vehicle.
Figure 5:
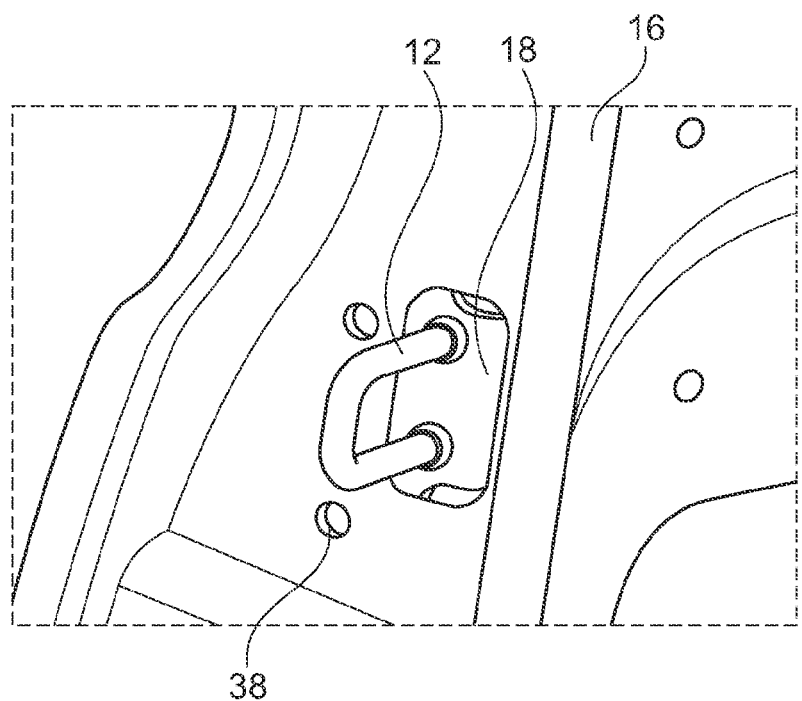
FIG. 5 is a perspective view of a safeguard element designed like a bracket as viewed from the front side of an allocated carrier.

This strike member 12 is provided with a mounting plate 18, which as depicted on FIG. 3 and FIG. 5 is supported against the rear side of the carrier sheet 16, coming to abut a comparatively large area thereof. The rear sides of the carrier sheets 14, 16 opposing each other with the door 15 in the closed position face away from each other, while the front sides face each other.

FIG. 1 presents an example for the rear side of the column-side carrier sheet 14, while FIG. 2 presents the corresponding rear view of the door-side carrier sheet 16.

In no way is it mandatory to arrange the strike member 12 on the door side. In an alternative configuration of the invention, it can also be provided that the safeguard element 12 designed as a bracket be arranged on the column side, and the corresponding safeguard element 22 on the sliding door side.

Figure 7:
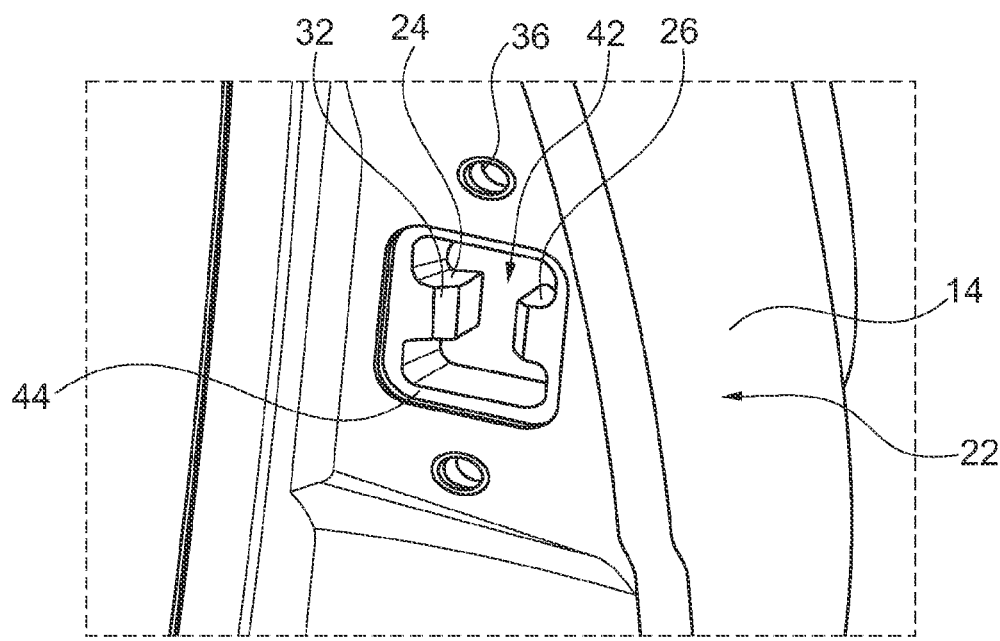
FIG. 7 is a perspective view of the column-side safeguard element provided with retention hooks as viewed from the front side of the column.
Figure 8:
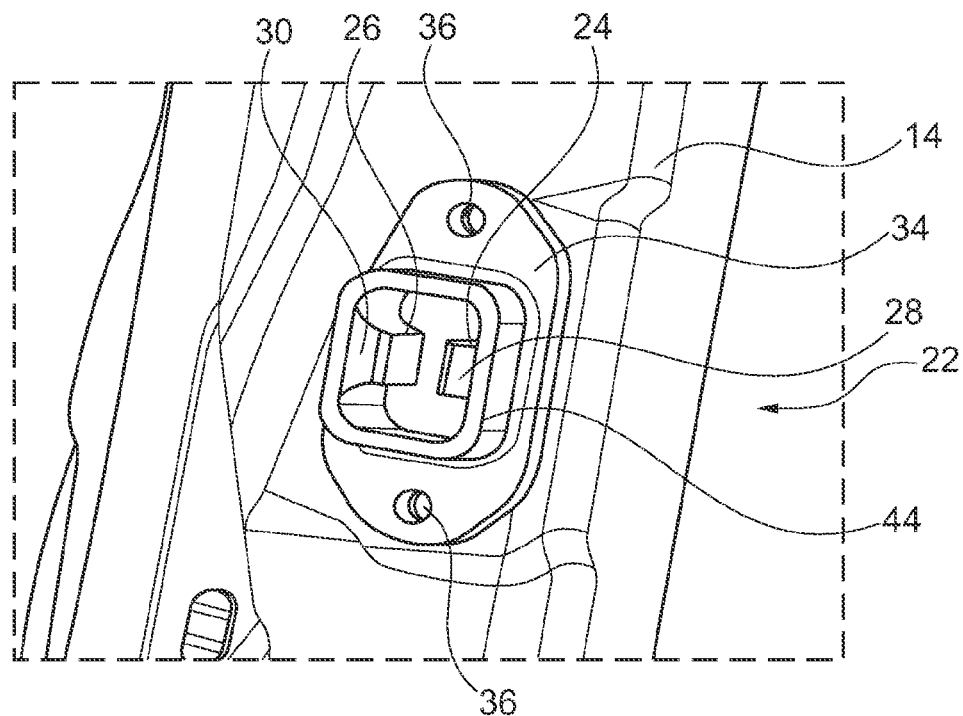
FIG. 8 is the safeguard element according to FIG. 7 in a perspective view as viewed from the rear side of the column.

As evident from a synopsis of FIG. 3, FIG. 7 and FIG. 8, the safeguard element 22 arranged on the column side has two retention hooks 24, 26 that oppose each other in the transverse direction of the vehicle, wherein the distance between the retention hooks is somewhat greater than the thickness of the strike member 12 to be introduced into the receptacle 42. As the sliding door 15 moves into the closed position depicted on FIG. 3 and FIG. 4, the door-side strike member 12 is preferably passed through said receptacle 42 of the safeguard element 22, preferably without contact, so that an end section of the strike member 12 that connects two legs of the strike member 12 and extends in the vertical direction of the vehicle comes to lie behind the back-cuts 28, 30 formed on the retention hooks 24, 26 as viewed in the insertion direction.

During any deformation of the door 15 or column 13 caused by exposure to an external force and accompanied by a relative shifting of the strike member 12 and retention hooks 24, 26, the strike member 12 comes to abut in one of the back-cuts 28, 30. The safeguard can to a great extent withstand a tensile stress caused by deformation that arises in combination with the above between the retention hooks 24, 26 in the transverse direction of the vehicle and strike member 12, so that the sliding door 15 is held against the column 13, in compliance with prescribed safety requirements.

The safeguard element 12 arranged on the door side comes to abut the rear of the door-side carrier 16 via the mounting plate 18. In this way, the corresponding safeguard element 22 has a mounting plate 34 expanded like a flange, which also abuts the rear of the column-side carrier 14, as depicted on FIG. 1, FIG. 4 and FIG. 8. Given a deformation-induced tensile stress on the safeguard element 22 and corresponding strike member 12, the arising forces are respectively introduced via the mounting plates 18, 34 coming to abut the rear of the carrier 14, 16 into the body or into the supporting structure of the door 15.

Because the mounting plates 18, 34 come to abut a relatively large surface area of the respective carrier 16, 14, point stresses on the carriers can be advantageously reduced, thereby increasing the stability and functional reliability of the entire safeguard 12, 22.

The retention hooks 24, 26 of the safeguard element 22 arranged on the column side have insertion inclines 32 that face the front side of the carrier 14 or the corresponding safeguard element 12, and support an insertion of the strike member 12 into the locating hole 42 provided on the safeguard element 22.

Figure 6:
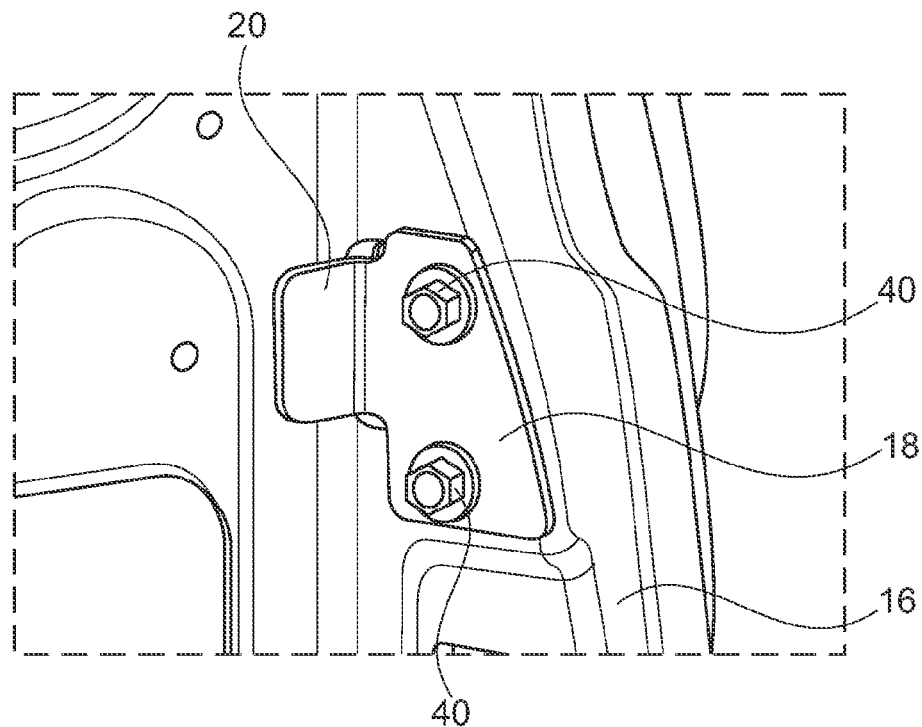
FIG. 6 is a perspective view of the safeguard element according to FIG. 5 as viewed from the rear side of the carrier.

The mounting plate 18 of the strike member 12 has an attachment hole 38 for securing an attachment nut 40, as illustrated on FIG. 3 and FIG. 6. The nut 40 can here be designed as a weld nut and pre-configured in such a way as to be connected with the mounting plate 18 already before the strike member 12 is assembled with the carrier 16.

A sufficiently strong connection between the strike member 12 and door-side carrier 16 can be achieved by introducing a suitable stud or fastening bolt from the front of the door-side carrier 16. Due to the rear abutment of the mounting plate 18 against the door-side carrier 16, the screwed connection is placed under a distinctly smaller load during exposure to tensile stress as would be the case if the mounting plate 18 were attached to the front side of the carrier 16 by means of a point screwed connection.

The column-side mounting element 22 is secured in a similar manner. The top and bottom section of the abutment flange 34, the latter has an attachment hole 36 that comes to lie with a corresponding opening in the carrier 14. A crewed connection can be used to also to establish a rigid and captive attachment between the safeguard element 22 and the carrier 14. It can here be provided that the attachment hole 36 of the safeguard element 22 is furnished with female thread, so that a sufficiently strong bond between the safeguard element 22 and carrier 14 can be achieved just by screwing in a correspondingly matching screw from the front side of the carrier 14 depicted on FIG. 7.

The rear abutment of the mounting plate 34 designed like a flange causes the screwed connection between the safeguard element 22 and carrier 14 to be exposed to only a negligible stress under a tensile load. A tensile stress acting on the safeguard element 22 is introduced into the mounting plate via the mounting plate designed like a flange and abutting the rear side of the carrier sheet 14.

Since the screwed connection of the safeguard elements 12, 22 with the allocated carrier sheets 16, 14 does not have to convey any force whatsoever during exposure to tensile stress, it can be designed in terms of dimensions and strength to reflect the lower load-bearing requirements, saving on costs and materials.

Figure 4:
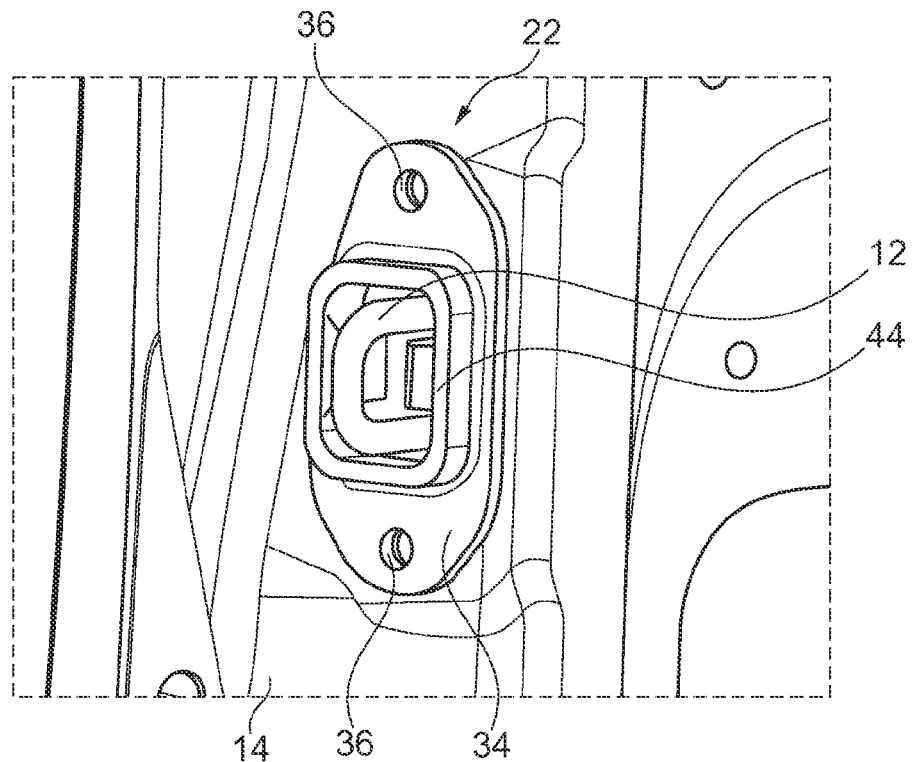
FIG. 4 is a magnified perspective view of the safeguard elements according to FIG. 1.

As shown on FIG. 3, FIG. 4 and FIG. 8, the safeguard element 22 to be arranged on the column side has a structurally reinforcing frame 44, inside of which the retention hooks 24, 26 extend. The frame 44 is preferably connected as a single piece with the mounting plate 34 designed as a flange, and is intended to counteract a deformation of the safeguard element 22 during exposure to a tensile stress.

The mounting plate 18 provided on the sliding door side has a mounting elbow 20 facing the interior of the vehicle, which essentially extends in the longitudinal direction of the vehicle, and abuts the supporting structure of the sliding door 15, facing the vehicle interior. During exposure of the sliding door 15 to an inside-out deformation acting from the interior on the door 15, this mounting elbow 20 can be used to bring about a corresponding outwardly directed shifting of the strike member 12, so that the strike member 12 comes to lie in the back cut 30 of the retention hook 26.

Therefore, the mounting elbow 20 can act as a means for absorbing the deformations of the sliding door structure 15 directed in the transverse direction of the vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A sliding door arrangement for a motor vehicle, comprising:
    a sliding door adapted to shift relative to a body of the motor vehicle which in a closed position borders a column of the body;
    a first safeguard element and a second safeguard element adapted to secure the sliding door against exposure to an external force, the first safeguard element arranged on one of a column-side carrier and a door-side carrier and the second safeguard element arranged on the other column-side carrier or door-side carrier, wherein in the closed position the first and second safeguard elements overlap each other at least regionally; and
    a mounting plate directly connected to at least one of the first safeguard element or the second safeguard element and abutting a rear side surface of one of the column-side carrier or the door-side carrier and facing away from the other carrier when the door is in the closed position; wherein
    the mounting plate includes an elbow;
    at least one of the first safeguard element or the second safeguard element comprises a strike member that when mounted on one of the carriers at least regionally penetrates through a through hole formed thereon;
    one of the first safeguard element or the second safeguard element comprises a locating hole with a pair of retention hooks arranged opposite each other in a transverse direction of the motor vehicle, wherein each retention hook comprises a back cut facing away from the carrier that is adapted to accommodate the corresponding safeguard element; and
    the elbow shifts the strike member to lie in the back cut of the retention hook in response to an inside-out deformation acting upon an interior of the sliding door.

2. The sliding door arrangement according to claim 1, wherein at least one of the column-side carrier and the door-side carrier includes an edge supporting the at least one of the first safeguard element or the second safeguard element with the mounting plate expanded like a flange relative to the through hole.

3. The sliding door arrangement according to claim 2, wherein both carriers define through holes that regionally overlap relative to each other and both carriers include edges which are secured to the first safeguard element and the second safeguard element.

4. The sliding door arrangement according to claim 1, wherein at least one of the first safeguard element or the second safeguard element comprises a structurally reinforcing frame that when mounted on one of the carriers comes to lie flush with the locating hole.

5. The sliding door arrangement according to claim 1, wherein the mounting plate comprises at least one attachment hole adapted to accommodate an attachment element.

6. The sliding door arrangement according to claim 5, wherein the attachment element is a weld.

7. The sliding door arrangement according to claim 5, wherein the attachment element is a screw.

8. The sliding door arrangement according to claim 5, wherein the attachment element is a stud.

9. The sliding door arrangement according to claim 5, wherein the mounting plate comprises a female thread in an area of the at least one attachment hole.

10. The sliding door arrangement according to claim 5, wherein a weld nut is arranged on the at least one attachment hole of the mounting plate in an assembled position.

11. The sliding door arrangement according to claim 1, wherein the first safeguard element is coupled to the mounting plate as a single piece.

12. The sliding door arrangement according to claim 1, wherein the second safeguard element is coupled to the mounting plate as a single piece.

13. The sliding door arrangement according to claim 1, wherein the elbow abuts the sliding door.

14. The sliding door arrangement according to claim 1, wherein the elbow extends in a longitudinal direction of the motor vehicle.

15. The sliding door arrangement according to claim 1, wherein the elbow faces an interior of the motor vehicle.

* * * * *